Nov. 26, 1929.　　　C. R. BOGGS　　　1,736,899
ELECTRICAL INSULATION
Filed June 28, 1927
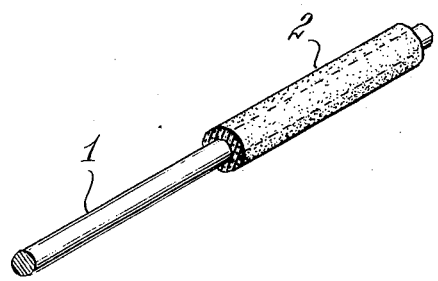
INVENTORS
Charles R. Boggs
BY
Pennie, Davis, Marvin & Edmonds
ATTORNEYS Patented Nov. 26, 1929

1,736,899

UNITED STATES PATENT OFFICE

CHARLES R. BOGGS, OF WABAN, MASSACHUSETTS, ASSIGNOR TO SIMPLEX WIRE & CABLE COMPANY, OF BOSTON, MASSACHUSETTS, A CORPORATION OF MASSACHUSETTS

ELECTRICAL INSULATION

Application filed June 28, 1927. Serial No. 202,155.

This invention relates to improvements in electrical insulation, and includes particularly improvements in moisture resistant rubber insulation or rubber insulation employed in sub-aqueous installations.

Rubber is usually regarded as a water proof material and many of its uses depend upon its ability to resist water. Ordinary natural rubber, however, whether vulcanized or unvulcanized, absorbs water to a marked extent on prolonged exposure, and in time the rubber usually becomes white and flabby. If a sheet of either raw or vulcanized ordinary natural rubber is soaked in water, being wiped dry and weighed at progressive intervals, it will be found gradually to increase in weight. The volume of the rubber also increases and the result is somewhat similar, on a reduced scale, to the swelling of rubber in organic solvents. This absorption of water by ordinary natural rubber is a material disadvantage where the rubber is employed in electrical insulation, particularly where the insulation is continuously exposed to water. For example, the decrease in specific resistance of the rubber, a measure of its insulating value, may amount to as much as 80% or more of the initial value after the absorption of 1% by volume of water. On prolonged exposure, say for 1,000 to 2,000 hours, or more, the absorption in some cases may substantially exceed 100%. This characteristic of ordinary rubber is of primary importance in connection with electrical cables laid under water. Statements have been made that water absorption does not seriously interfere with the electrical properties of rubber insulation exposed to water, and this may be true to a limited extent where vulcanized rubber is employed under certain conditions in low tension installations. In low tension work, the insulation wall can, conveniently and without too great expense, be made thick enough to include a very large factor of safety. The electrical properties of rubber, however, are vitally affected by absorption of even small amounts of water, so much so that there are practically no sub-aqueous high tension cables laid which depend on rubber insulation if exposed to the action of water. If exposed to water, ordinary rubber insulation on low tension cables must be excessively thick. To illustrate the importance of the difficulties encountered, one expedient commonly employed is to enclose the complete cable in a sheathing of lead or the like, a cumbersome and expensive remedy.

I have discovered that the absorption of water by the ordinary natural rubber, and by compounds made up of ordinary natural rubber, is due, primarily, to the presence in the rubber of non-rubber constituents which apparently act as protective colloids tending to redisperse, to some extent, the rubber hydrocarbon in the water. I have found the proteins, or albumens, present in ordinary natural rubber, particularly to be agents promoting the absorption of water. Apparently, the rubber globule in latex consists of a hydrocarbon portion surrounded by an envelope of protein, the remainder of the non-rubber constituents being adsorbed on the surface of the globules, and this envelope seems to act as a dispersing agent for the rubber. Resins present in ordinary natural rubber also have a detrimental effect upon the properties of the rubber with respect to water.

Synthetic rubber, for example rubber produced by the polymerization of butadiene, isoprene or dimethyl-butaliene is free from such active rubber dispersing agents or from such non-rubber constituents acting as protective colloids for the rubber, and I have found it to be a particularly valuable insulating material where resistance to water is important. In accordance with the present invention, electrical conductors, such as the conducting core in electrical cables, are covered with an insulating wall made up of synthetic rubber. The synthetic rubber may be employed in a vulcanized, or in a partially vulcanized, or in an unvulcanized condition, and either alone or in compounded mixture. If the synthetic rubber is of a character such that it is unstable in the unvulcanized condition, it is vulcanized at least sufficiently to overcome any tendency toward instability. The rubber may be vulcanized with inorganic or organic vulcanization accelerators in the usual way. Such electrical insulation is of satisfactory electrical properties with respect to water and is adapted for use in either salt water or fresh water without being subject to serious electrical deterioration on prolonged exposure. An electrical cable insulated in accordance with this invention, for example, comprises a conducting core covered with an insulating wall of synthetic rubber in an appropriate condition of vulcanization. The vulcanization can be carried out with sulphur in an inorganic or organic vulcanization accelerator in the usual way. The insulating wall may include in addition to the synthetic rubber one or more suitable fillers or compounding agents. One suitable filler is comminuted vulcanized rubber, advantageously produced by vulcanization of synthetic rubber or by vulcanization of the improved rubber product described in my prior application filed April 7, 1925, Serial No. 21,410.

An insulating compound suitable for application to an electrical conductor in accordance with the present invention can be made by vulcanizing a mixture of 200 parts of synthetic rubber, 20 parts of zinc oxide, 16 parts of sulphur, 10 parts of paraffine and 2 parts of Tuads (tetramethylthiuramdisulphide) at 265° F. for thirty minutes. Synthetic rubber having a maximum acetone extract of 1.76%, a maximum water extract of 0.29% and a maximum ash content of 0.76% in the above compound gives results markedly superior to those obtained with either pale crepe, smoked sheets or washed smoked sheets in similar compounds; after immersion for periods of twenty hours and one hundred hours in fresh water at a temperature of 70° F., the synthetic rubber compound just described absorbs less than one-fifth, in each instance, of the water absorbed by similar compounds made up, for example, of smoked sheets.

An insulated electrical conductor embodying the invention is illustrated in the accompanying drawing, a fragmentary view with parts broken away. The insulated electrical conductor illustrated in the accompanying drawing comprises a conducting core 1 covered with a wall of synthetic rubber insulation 2 substantially free from active rubber dispersing agents or non-rubber constituents acting as protective colloids for the rubber and adapted to resist water.

I claim:

1. An insulated electrical conductor comprising a conducting core covered with a wall of synthetic rubber substantially free from active rubber dispersing agents or non-rubber constituents acting as protective colloids for the rubber and adapted to resist water.

2. An insulated electrical conductor comprising a conducting core covered with a wall of vulcanized synthetic rubber substantially free from active rubber dispersing agents or non-rubber constituents acting as protective colloids for the rubber and adapted to resist water.

In testimony whereof I affix my signature.

CHARLES R. BOGGS.